May 18, 1954  H. L. DANIELS ET AL  2,679,035
CATHODE-RAY TUBE CHARACTER DISPLAY SYSTEM
Filed Oct. 29, 1952  7 Sheets-Sheet 1

*INVENTOR.*
HOWARD L. DANIELS
JOHN W. HOGAN

BY Howard L. Rose

*AGENT*

INVENTOR.
HOWARD L. DANIELS
JOHN W. HOGAN
BY Howard L. Rose
AGENT.

INVENTOR
HOWARD L. DANIELS
JOHN W. HOGAN

BY Howard L. Rose

AGENT

INVENTOR
HOWARD L. DANIELS
JOHN W. HOGAN

BY Howard L. Rose

AGENT

Patented May 18, 1954

2,679,035

UNITED STATES PATENT OFFICE 2,679,035

CATHODE-RAY TUBE CHARACTER DISPLAY SYSTEM

Howard L. Daniels, St. Paul, and John W. Hogan, Minneapolis, Minn., assignors, by mesne assignments, to the United States of America as represented by the Secretary of Commerce Application October 29, 1952, Serial No. 317,554

12 Claims. (Cl. 340—165)

The present invention relates to a magnetic numeroscope printer and in particular to equipment which will print successive selected characters at a very high rate of speed. Modern electronic computers, which are inherently very high speed machines, have been handicapped in the past by the inability of the output equipment to match the speeds attained by the computer. Up to the present time there have been a number of systems available for obtaining permanent records of the output from computers. However, most of these systems are comparatively slow and therefore restrict the rate at which the machine may operate.

The primary object of the present invention is to provide a device capable of printing the output of high-speed computing machines at sufficient speed to avoid any restriction by the printer on the use of the computers.

Another object of the invention is to provide high-speed output means capable of making a permanent record of the output information.

Another object of the invention is to provide means for displaying the output information from a computer on a cathode-ray tube, which information may be photographed on the face of the tube.

Another object of the invention is to provide a system which is capable of displaying information on a cathode-ray tube, which information may be put into the system by means of a manual keying device or directly from the computer.

Another object of the invention is to provide a high-speed device that is capable of writing the output from a computer on the face of a cathode-ray tube in rows and columns.

Another object of the invention is to provide a high-speed printer capable of printing several thousand characters per second.

In accordance with the present invention there is provided a magnetic medium for carrying the horizontal and vertical signals necessary for displaying any one of a number of characters on a cathode ray tube. This information is picked up by magnetic heads from the magnetic medium and passed on to the cathode-ray tube through gating amplifiers. The gating amplifiers are normally blocked and are opened one at a time in accordance with the number to be displayed on the tube. The proper amplifier to be opened is chosen by the output from the computer operating through a ring counter in conjunction with position pulse means that are also recorded on the magnetic medium. This ring counter may also be energized by electrical contacts, which are closed when a particular key of a typewriter-like machine is struck, each key representing a character to be displayed on the face of the tube.

Other uses and advantages of the invention will become apparent upon reference to the specification and drawings.

Figure 1:
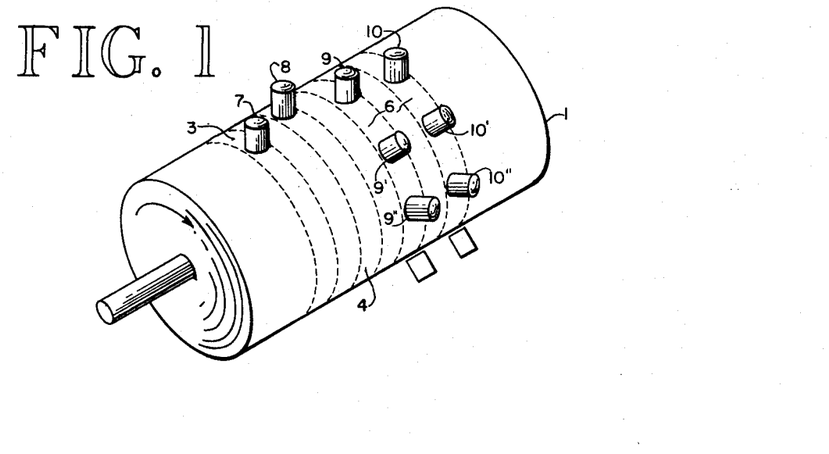
Figure 1 is a diagrammatic showing of a magnetizable drum on which the information may be recorded.
Figure 3:
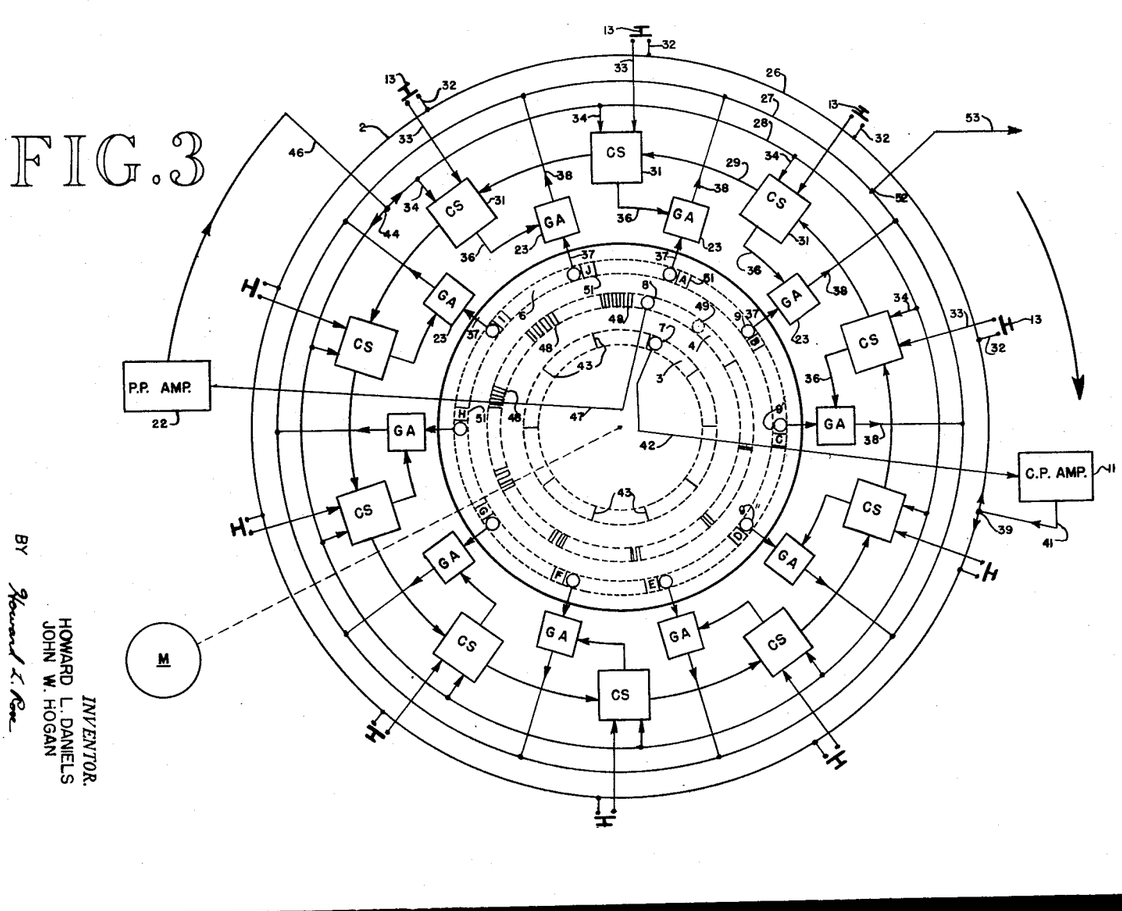
Figures 3 to 7 are partial block diagrams exhibiting the operation of the selection circuit at various points during a typical cycle of operation.

As indicated above, the deflection signals for the information to be displayed on the face of the cathode-ray tube are obtained from a magnetizable record member which rotates. Such member may be in the form of a rotatable drum 1, as shown in Figure 1, or a rotatable disk 2 having a magnetizable surface as shown in Figure 3. In the case of each type of record member there will be, according to the present invention, a track 3 devoted to carrying what may be termed "clock pulses," a track 4 devoted to what may be termed "position pulses," and two or more additional tracks 6 devoted to whatever variety of information is to be recorded on or read from the magnetizable member. Under the principles of the present invention there will be a transducing head 7, positioned to operate in the clock pulse track 3, a head 8, positioned to operate in the position track 4, and heads 9 and 10 or groups of heads 9 and 10, 9' and 10', etc., positioned to operate in the intelligence tracks 6. The short access time according to the present invention is to be attributed to the existence of a plurality of transducing heads positioned to operate along the path of travel of the intelligence tracks 6. For example, in Figures 1 and 3, there is shown a first set of intelligence transducers 9 and 10, a second set 9' and 10', a third set 9'' and 10'', etc., at spaced positions along the intelligence track.

Figure 2:
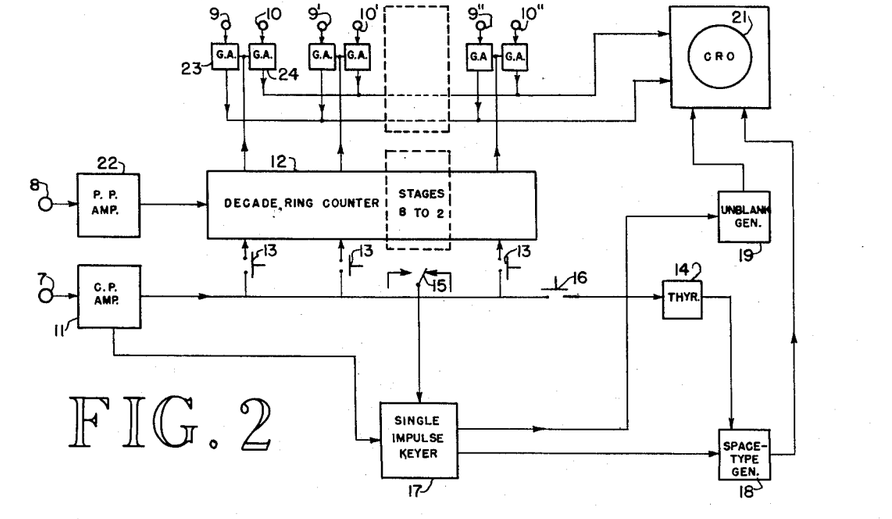
Figure 2 is a simplified block diagram of the over-all system using manual keying.

Referring to Figure 2, there is shown a system in accordance with the present invention in which the character selector system is a manual device. Although the invention is primarily concerned with an electronic keying device, the manual system will be described first, since it more readily lends itself to explanation.

The transducer head 7, which is positioned as shown in Figures 1 and 3, picks up the clock pulses and feeds them to the clock pulse amplifier 11. The output of the amplifier is connected to each stage of the ring counter 12 through the keying switches 13, to the discharge thyratron 14 through the carriage return switch 16, and to the single impulse keyer 17. The enabling switch 15 is actuated each time any one of the keys 13 is depressed, and the signal thus produced is connected to the single impulse keyer 17. There are two outputs from the single impulse keyer, one to the space-type generator 18 and the other to the unblanking generator 19. The output of the discharge thyratron is connected to a second input to the space-type generator. The outputs of the space-type generator and the unblanking generator are connected to the cathode-ray oscilloscope 21.

The transducer head 8 is responsive to the position pulses on track 4 of the magnetic drum or disk and the output of the head is fed to the amplifier 22. The output of the amplifier is connected to the ring counter 12. The output from each stage of the ring counter is connected to a corresponding group of 2 gating amplifiers 23 and 24. Associated with each amplifier 23 is a transducer head 9, which picks up the horizontal deflection signal from the magnetic recording medium, and connected to each amplifier 24 is a transducer head 10, which picks up the vertical deflection signals. The outputs of the amplifiers 23 and 24 are fed to the horizontal and vertical deflection plates respectively of the cathode-ray tube.

Briefly, the operation of the system is as follows: When one of the keys 13 is depressed, the clock pulses, which are picked up from track 3 by the head 7 and amplified by amplifier 11, are fed through the depressed key to the corresponding stage of the ring counter setting that particular stage of the counter. The position pulses, which also are put into the ring counter, step the counter around until the gating amplifiers 23 and 24 are chosen, which are receiving the information from the transducing heads that correspond to the information selected by depressing the key 13. The gating amplifiers 23 and 24 then pass the information picked up by these heads to the cathode-ray tube. During the above period, while selection of the correct transducer head is taking place, it is necessary to ready the oscilloscope for receipt of the information. In order to do this it is necessary to unblock the electron beam of the cathode-ray tube, which is normally blocked, and also to move the horizontal mean beam position of the tube. The latter is necessary so that the numbers may be written in rows instead of one on top of another. To accomplish these results there is provided a single impulse keyer 17. The keyer 17 is set by the push button 15, which is depressed each time one of the push buttons 13 is actuated. The keyer is then energized by the next clock pulse and puts out two different pulses. One of these pulses feeds the unblanking generator 19, the output of which allows the electron beam of the tube to reach the phosphor surface. The other output feeds the type-space generator 18, which positions the beam in the horizontal direction. This generator 18 has a staircase output, the output shifting one step each time a key 13 is depressed. This provides the necessary voltage on the horizontal deflection plates so that the numbers on the face of the scope will appear side by side instead of one on top of the other. When the typewriter-like machine, of which the keys 13 are a part, has reached the end of its carriage, the carriage switch 16 is depressed and the discharge thyratron 14 is fired. This discharges the type-space generator and allows the voltage output to return to zero and thereby the beam is brought back to the starting side of the tube. The operation of the ring counter will now be explained in detail with reference to Figure 3.

In Figure 3, it will be understood that the area between the dashed lines designated by the reference character 6 is intended to represent either one or more intelligence tracks. Accordingly the circles designated 9, 9', 9", et cetera, refer to the intelligence transducing heads and may be interpreted as indicating either one or more heads, depending upon the number of tracks involved.

Reference will hereinafter be made to Figure 3 and in addition to Figures 4 through 7 for an understanding of the selection mechanism. The description of the circuit is made in connection with the disk 2 of Figure 3 simply because a disk permits a more convenient layout of the associated circuitry. As the description proceeds, the use of either a drum or disk or the like will become apparent.

Referring specifically to Figure 3, as above stated the clock pulse track 3, positional data track 4, and intelligence track or tracks 6 are indicated. In addition, the clock pulse transducer 7, positional data transducer 8, and the intelligence transducers 9, 9', et cetera, are so designated.

It will be noted from Figure 3 that the circuitry consists basically of ten circuit units, which are interconnected by circumferentially extending lines 26, 27, 28, and 29. Each section of the circuit consists of a counter stage 31, gating amplifier circuit 23 and a keying switch 13. The keying switch 13 of each section has one terminal connected over line 32 to circumferential line 26 and has its other terminal connected over line 33 as one input to the counter stage 31. A second input to each counter stage is provided over line 34 connected with circumferential line 28, and an output of each counter stage is connected over line 36 as an enabling input to the gating amplifier circuit 23. The gating circuits 23 are each additionally supplied with an input from the intelligence track heads 9, this connection being over line 37. It will be understood that where transducers 9 are in fact multiplied for "parallel" operation, there will be an equal number of distinct gating circuits at 23.

The output of gating amplifier circuits 23 are connected in each section over line 38 to the circumferential line 27. The circumferential lines 29 serve as an interconnection between successive counter stages 31, proceeding in a counterclockwise direction about the circuit as shown in Figure 3.

The circumferential conductor 26 is connected as at junction 39 to a line 41 over which is available a series of clock pulses from a clock pulse amplifier 11. Input pulses to amplifier 11 are provided over a line 42 extending from the clock pulse transducer head 7 operating in the clock pulse track 3. The track 3 will have permanently recorded therein, in the present example, ten flux spots or cells equally spaced about the track. These cells are diagrammatically indicated in Figure 3 as lines transverse to the track 3 and are designated by reference character 43.

It will be understood that any number of counter stages are possible, ten being described here only for purposes of illustration.

The circumferential line 26 is connected as at junction 44 to receive over a line 46 positional pulse information from a position pulse amplifier circuit 22. The input to circuit 22 is over a line 47 connected with the position pulse transducing head 8 operating in track 4. As indicated in Figure 3, the track will contain in ten spaced positions about the track a group of discrete flux spots or cells here designated 48. There may be one sectional length of the track 4 being void of flux cells, this being designated by reference character 49. Then, at a proportionate distance along track 4 clockwise as viewed in Figure 3, there will be a single cell 48. At the next divisional position, there are two cells 48 and so forth to a maximum of nine cells, illustrated immediately to the right of head 8 in Figure 3.

Figure 4:
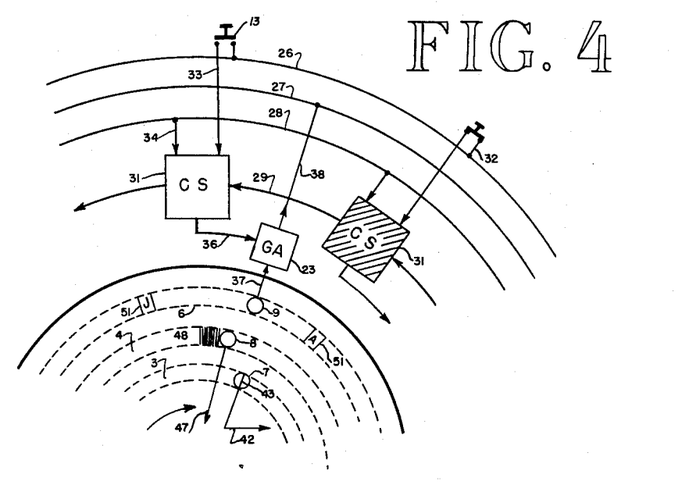

In the intelligence track or tracks 6 there will be areas (conveniently illustrated in the drawing as rectangles) designated 51, which will be reserved for receiving and having reproduced therefrom some form of intelligence. For purposes of the present illustration the information contained within the area 51 will be referred to as characters. Generally speaking, the characters within the area 51 may represent any sort of data or the like and for the purposes of the present invention it is only necessary to understand that each of the areas 51 bears some predetermined position or relationship with the groups of positional data in track 4. The data within the areas 51 may be assigned any designation at random and in Figure 3 the letters A—J serve the purpose of such identification. Under the designations employed in Figure 3, it is simply required that the area A be known to lie in approximate radial relationship with the void space 49 of track 4, the area B have a similar relationship to the single positional cell clockwise from void 49, area C to be related to the double cell in the positional track and so forth around the track.

It may further be noted at this point that the circumferential line 27 is connected as at junction 52 with a line 53, which serves as the output to the cathode-ray oscilloscope 21. That is, as will appear more fully below, when a gating amplifier circuit is "open," data read from the associated intelligence transducer 9 will be available through line 38 and the line 27 to the line 53.

The system has been described thus far as having a single transducer head 9 and a single gating amplifier 23 associated with each character. Actually there will be two transducer heads 9 and 10 and two gating amplifiers 23 and 24 associated with each character as shown in Figure 2. As a result there will be two circumferential lines 27 and two output lines 53. It will be further understood that the line 53 may serve as an input of information. That is, the apparatus may be used in a system wherein it is desired to record as well as to read information from the intelligence tracks 6. In this instance, the gating amplifier circuits 23 may be replaced with or complemented by suitable writing circuits to be triggered at appropriate times over line 36 leading from the counter stage.

It may now be assumed that the disk 2 has recorded therein the clock pulses and position pulses as explained above. Also, it may be assumed that certain information exists in each of the data areas A—J. It will, of course, be understood that the data areas may extend lengthwise along track 6 to occupy substantially all of the allotted track, rather than being relatively small areas as indicated. A motor M is connected by shaft M' to drive the disk 2 at a suitable speed.

If the information contained within each of the areas A—J is known (or if recording is to be accomplished, what is to be placed therein) each of the pushbutton switches 13 may be designated in a corresponding fashion. That is, as shown in Figure 3, the pushbuttons 13 are indicated as pertaining to items A—J.

With the disk running at the selected speed due to energization of motor M, it will now be supposed that one wishes to produce on output line 53 the information recorded in area B on track 6. To obtain this action, the B pushbutton 13 will be actuated to close the circuit between circumferential line 26 and line 33 feeding counter stage 31 connected therewith. The immediate result may be understood with reference to Figure 4, which is a segmental view of the illustration in Figure 3. With the B pushbutton switch depressed, the complete ring counter comprising all ten of the counter stages 31 in series will be preset to a "count" representative of the "B" stage by reason of the counter stage associated with the B pushbutton being energized as soon as a clock pulse next appears on circumferential line 26 interconnected with the clock pulse amplifier 11. This will occur as indicated in Figure 4 when a clock pulse flux cell 43 passes the clock pulse transducer 7.

Figure 5:
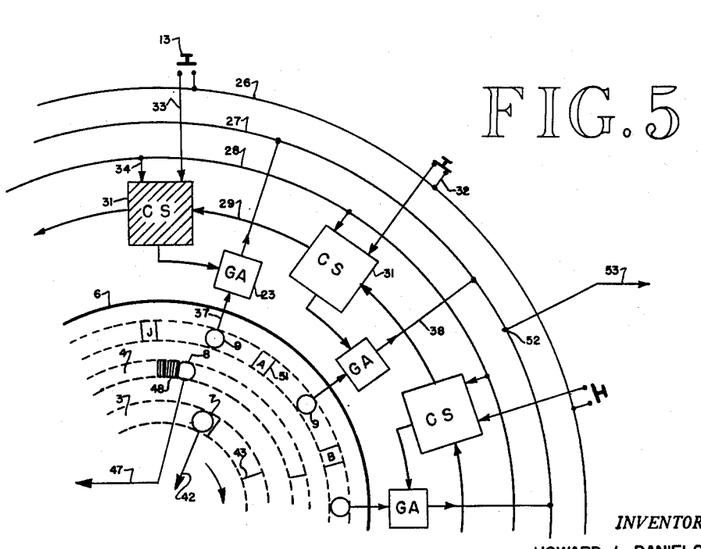
Figure 6:
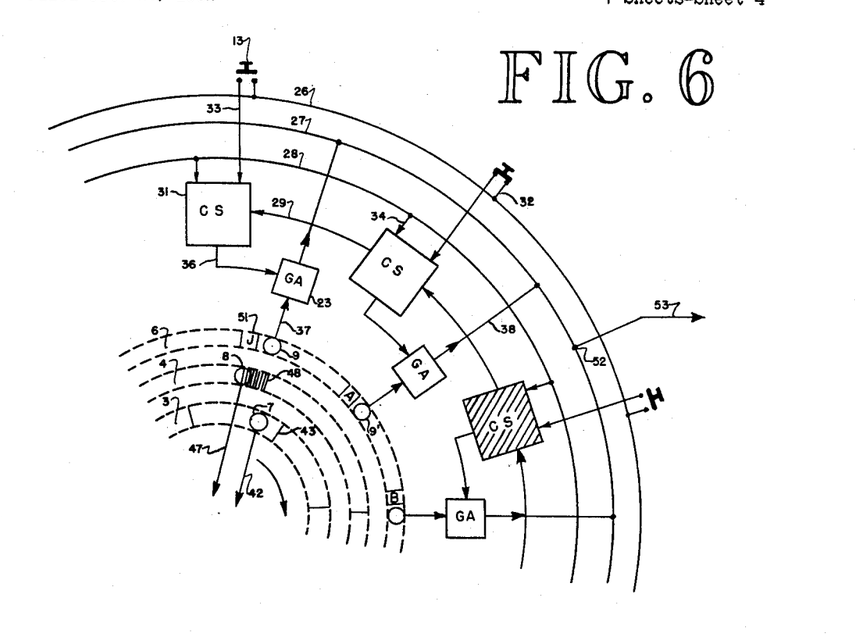
Figure 7:
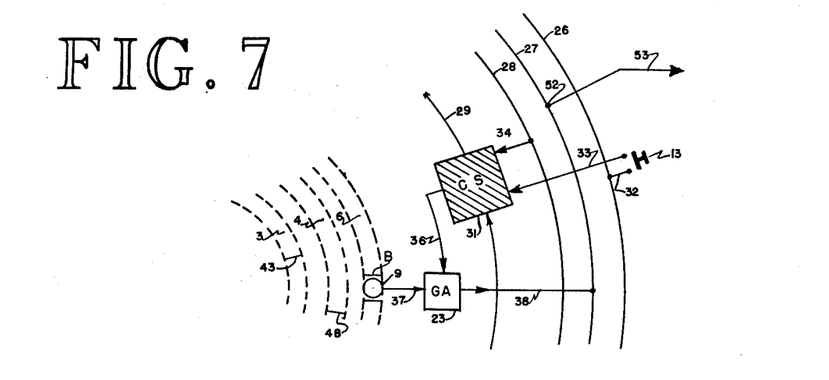

Next, as can be appreciated from Figures 5 and 6, each of the counter stages 31 will be energized simultaneously over input lines 34 as pulses developed through the position pulse amplifier 22 are applied to circumferential line 28. This sequence of pulses, caused by the positional data transducer 8 responding to the positional flux cells 48 will cause the active (cross-hatched) stage of the counter to advance counterclockwise about the counter ring according to the number of positional cells or spots in the particular positional group which is energizing the transducing head 8. In the present instance, there are nine positional spots 48 passing the head 8 and this indicates to the circuitry that the disk 2 is in such position relative to positional head 8 that the desired B area of the intelligence track 6 has just passed the transducer 9 associated with the B stage (by coincidence in this description) and is in closest anticipatory proximity to the transducers 9 of section C.

As may be understood with reference to Figure 6, the passing of the final or ninth flux cell 48 beneath the positional transducer head 8 results in the energized stage of the ring counter having been transferred from one counter stage to the next counterclockwise as in Figures 3–6 to the counter stage 31 located in the C section of the circuit. The grouping of the cells 48 is of such length that the C counter stage 31 is energized by the time the B area of intelligence track 6 has arrived in proximity to the intelligence transducer 9 associated with the C section, which is now energized so that the gating amplifier circuit 23 thereof is "open" by virtue of an energizing signal on the counter stage output line 36. Now, as can be appreciated from Figure 7, the data in the B area of track 6 is picked up by the transducer head 9 and produced on the output line 53.

It is of interest to note that so long as the "B" pushbutton is held closed, the "B" data will flow through line 53, as the data passes each set of heads 9.

From the foregoing it will be clear that the intelligence data B has been picked up in less than two-tenths revolution of the disk, and it has not been necessary for this data to be subject to the delay up to a complete disk revolution before being read. The delay in obtaining the information is two-tenths of a revolution when there are only ten characters positioned around the disk. Where more characters are placed about the disk the delay will be correspondingly smaller. Furthermore, it will be clear that all of the other gating amplifier circuits 31 in the other sections of the circuit have been disabled, so that no other information is available on the circumferential line 27 for transmission to the output line 53.

Although only ten intelligence areas 51 have been shown as spaced around the disk in this example, the system is not limited to this number, and it is entirely possible to pack the information areas closer than is shown in the drawings, thereby allowing far more areas to be put on the disk or drum.

No limitation to the specific illustrated circuit is intended, it being clear that the operation is based on the general provision of suitable means such as a counter which is preset or conditioned according to the desired information, and then is advanced a differential amount according to the positional data next picked up to control the output enabling means at a point along the path of travel of the intelligence areas which will be next intercepted by the portion of the intelligence tracks containing the desired information. It will be understood that the combination of elements and equivalents thereof, as shown in Figure 3, does not per se form a part of the present invention but constitutes the subject matter of U. S. application Serial No. 273,490, of the present inventors, filed February 26, 1952.

The system of the present invention will now be described with reference to Figures 8 and 9, which taken together constitute an expanded block diagram of the circuit shown in Figure 2. The wires 53, 55, 60 and 65 of Figure 9 are connected to wires 53, 55, 60 and 65, respectively, of Figure 8. The clock pulse amplifier 11 is made up of an amplifier 54, a clipper 56, an inverter 57, a single-shot multivibrator 58, and a cathode follower 59, which serves as the output stage of the clock-pulse amplifier. The decade ring counter 12 is made up of ten stages 31, each stage including a bi-stable flipflop 61 and the isolation diode 62 through which the output from the amplifier 11 is applied to the flipflop. The position pulse amplifier 22 is composed of an amplifier 63, a clipper 64, an inverter 66, a single-shot multivibrator 67 and an output amplifier 68. The single impulse keyer 17 is made up of an isolation diode 69 through which the output from the clock pulse amplifier 11 is applied, a bi-stable flipflop 71, a differentiator 72, a buffer amplifier 73, a single-shot multivibrator 74 and a dual output inverter 76. One of the outputs 65 of the inverter is applied to the space-type generator 18, which is composed of a differentiator 77, a single-shot multivibrator 78, a step-by-step counter 79, and a cathode follower 81 as the output stage.

The step-by-step counter 79 is made up of two diodes 82 and 83 and capacitor 84. The diode 82 is connected from the output of the multivibrator to ground, the plate being grounded. The diode 83 has its plate conected to the output of the multivibrator, and the cathode connected through the memory capacitor 84 to ground. The output of the step-by-step counter is taken from the cathode lead of the diode 83. The plate of the discharge thyratron 14 is also connected to this point. The cathode of the thyratron is grounded and its grid is connected to the output of the clock pulse amplifier 11 through the carriage return key 16.

The other output 60 of the single impulse keyer 17 is applied to the unblanking generator 19 which consists of the differentiator 85 the single-shot multivibrator 86 and a cathode follower 87 as the output stage.

The gating amplifier 23 for flipflop stage 10 is shown in its complete form. Each gating amplifier consists of an integrator amplifier 88, a cathode follower 89, an inverter 91 and the gate 92 which receives the information pulse from the inverter and the gating pulse from the flipflop 61. (The integrator amplifier 88 and cathode follower 89 constitute a special circuit which is the subject of Patent No. 2,489,272, issued November 29, 1949 to Howard L. Daniels.) The output from the amplifiers 23 and 24 is fed to the horizontal and vertical deflection circuits respectively of the cathode-ray oscilloscope 21.

The operation is as follows: The clock pulses which are picked up by the pickup head 7 are amplified and clipped. The pulse is then inverted and the output of the inverter 57 is used to trigger a one-shot multivibrator 58. This multivibrator is used to obtain a pulse of a predetermined amplitude and width as are the multivibrators in the other components of the circuit. The output of the multivibrator 58 is fed to a cathode follower. The shape of the pulses after being operated upon by each component is shown just below the line connecting the component with the next circuit element. This is done throughout the drawing. Two outputs are taken from the cathode follower. The upper lead feeds the isolation diodes of the flipflop stages through the character push buttons. When the push button is actuated, the output from the clock pulse amplifier will set the flipflop connected to that button so that when a pulse appears on the position pulse input an output pulse from the flipflop will be produced which will set the next flipflop, which will then be flipped by the next position pulse and so forth. This will step the ring counter around one stage for each position pulse. The position pulses are picked up by the pickup head 8, amplified, clipped, inverted, and the pulses thus produced trigger the one-shot multivibrator 67, the output of which feeds the amplifier 68. The output of the amplifier is fed to each of the ten stages of the ring counter, and as previously described will cause the proper gating amplifier to be opened. The information to be read from the magnetic drum is detected on the magnetic drum by the pickup heads 9 and 10 which feed the gating amplifiers 23 and 24, one for the horizontal and one for the vertical signal. The character signals thus obtained are amplified and applied to the cathode-ray oscilloscope 21. The character signals are recorded on the drum in the form of predetermined flux distributions which are proportional to the desired signal on the output. Since the voltages produced in the pickup heads are the time derivatives of the flux linkages on the drum it is necessary that these signals be integrated. Therefore, the first stage of the gating amplifier circuit must integrate this signal to reproduce the signal as originally recorded. The output of the integrating amplifier passes through a cathode follower, then through the inverter, and through the gating circuit. When the amplifier has been gated, the information will be fed to the horizontal and vertical deflection circuits, respectively, of the cathode-ray oscilloscope.

The output of the clock pulse amplifier is also fed to the single impulse keyer through the isolation diode 69. The flipflop 71 is enabled by the switch 15, which is actuated at the same time that the character pushbutton is depressed. This pulse from the switch 15 enables the flipflop so that when a clock pulse appears on the input it flips the flipflop providing an output pulse. Therefore the single impulse keyer will pass a signal each time a key is depressed and in this way the opening of the gating amplifiers and unblocking and stepping of the beam are synchronized. The output of the flipflop is differentiated, clipped, and fed to the single-shot multivibrator 74. The flipflop will remain flipped until the character pushbutton is released thereby insuring that only one trigger pulse will be produced. The output of the multivibrator is fed to the inverter. The inverter has two outputs, one of which is fed to the unblanking generator 19 where it is differentiated, and then fed to the single-shot multivibrator. The output of the multivibrator is fed to the cathode follower and the output of the cathode follower fed subsequently to the grid of the cathode-ray tube. This signal restores full intensity to the cathode-ray tube beam during the time the desired character deflection signals are being gated to the cathode-ray tube. The other output from the inverter of the signal impulse keyer is fed to the type space generator 18. The input pulse passes through the differentiator and the trailing edge of the wave thus formed is used to trigger the single-shot multivibrator. The output of the multivibrator is fed to the step-by-step counter 79. The memory capacitor 84 in the counter is directly coupled to the grid of the cathode-follower stage. The charge on the memory capacitor is increased a predetermined amount by each succeeding pulse from the multivibrator. This therefore produces a stairstep output from the cathode follower stage which is applied to one grid of the paraphase amplifier of the output section of the cathode-ray oscilloscope. This output is used to step the mean beam position across the face of the tube in predetermined steps so that the characters on the face of the cathode-ray tube will appear side by side; that is, in rows. The memory capacitor is discharged by the discharge thyratron which is fired by a clock pulse from the amplifier 11 that is passed by the carriage return button on the typewriter-like keying instrument. Therefore when the end of the line is reached, the switch is closed, the thyratron fires, and the capacitor is discharged through the thyratron. When the capacitor is discharged there is no longer a plate supply for the thyratron, and it is shut off. When the capacitor is discharged the beam is repositioned at the beginning of the next line.

As can be seen from the above description any time a key 13 is depressed the operation of the circuit is such that a number will be written in its proper position on the face of the cathode-ray tube. In order that the figures may be written in columns, one below the other, the cathode-ray tube is turned at the angle indicated by the line 85 on the face of the cathode-ray tube. As will be described later, these figures are to be photographed by a moving film. The angle at which the tube is turned is determined by the speed of the film. This provides for writing the numbers in columns in the following manner. The first character is written on the left-hand side of the tube. As the film advances, the next character will be written slightly above where the first figure was written as indicated by the line 85. This then will make the second figure appear on the film as if it were written on the same horizontal line as the original figure, since the film is moving downward. When the end of the line is reached, the beam will return to its original position at the left-hand side of the tube, and since the film has advanced the equivalent of one line, the next character that is written in the left-hand column will be one line above the character first written in that column. Of course, the film may run up or down as desired.

Figure 10:
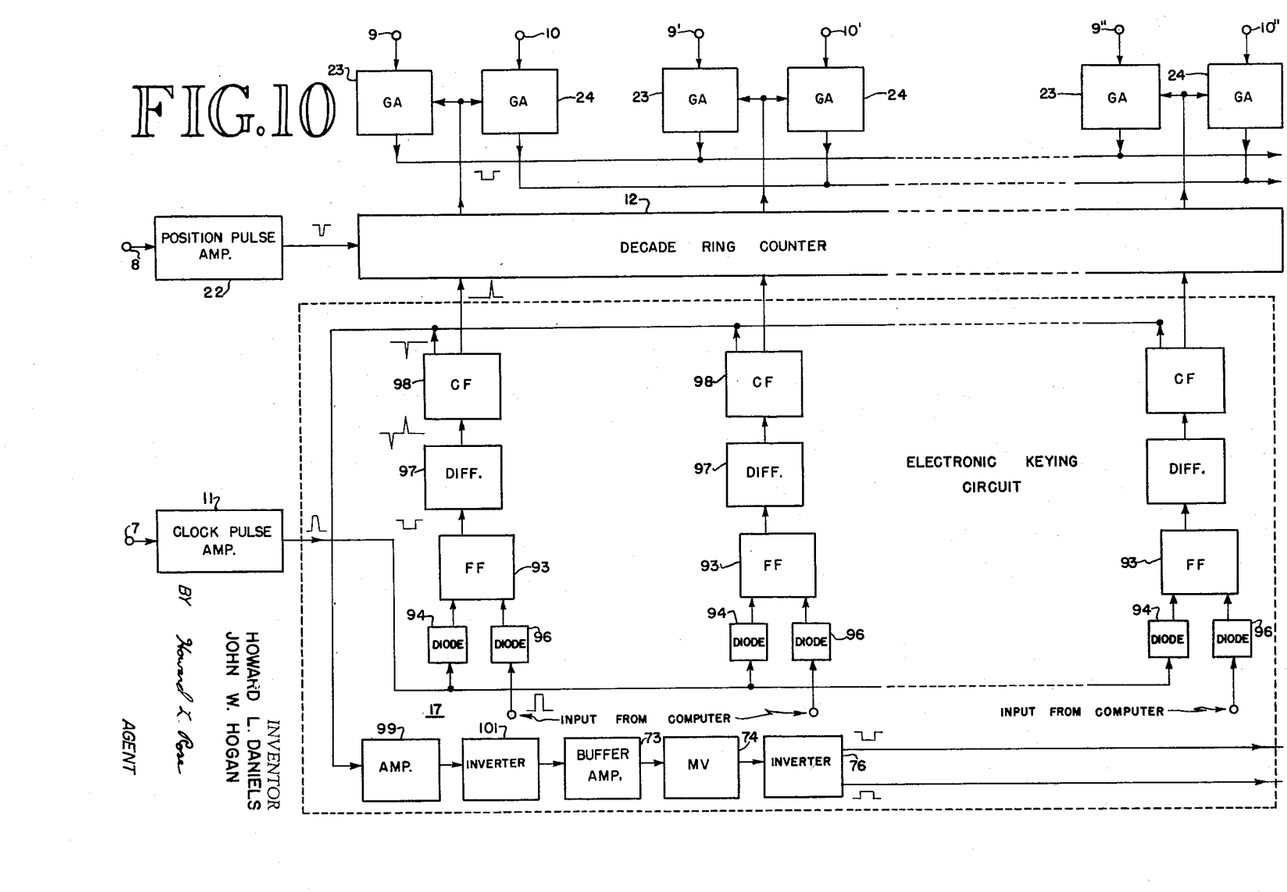
Figure 10 is a circuit diagram of an electronic keying circuit which may be used for operation with a computer.

The invention to this point has been described as being used with a manual keying device, the proper key of which is depressed when a particular figure is to be written on the face of the cathode-ray tube. However, when the system is to be used with a computer, an automatic keyer must be provided for operating the selection circuits. The circuit employed for this purpose is shown in Figure 10. In this figure only those circuit components which cooperate directly with the automatic keyer are shown. The automatic keyer consists of a dual input flipflop 93, there being one flipflop for each counter stage. The output of the clock pulse amplifier is fed to one input of each flipflop 93 through the isolation diodes 94. The other input to the flipflops comes from the computer through the isolation diodes 96. The output of each flipflop is connected through a differentiator 97 to a cathode follower 98 which has two outputs 180 degrees out of phase. The one output is connected to the counter stage 31 over line 33, and the other output is connected to the single impulse keyer 17. In this circuit the single impulse keyer consists of an amplifier 99, an inverter 101, a buffer amplifier 73, a single-shot multivibrator 74 and a dual output inverter 76.

The operation of the automatic keyer is as follows: The output of the computer appears on the input to the flipflop 93 corresponding to the number that it is desired to display on the tube. This sets the flipflop so that when a clock pulse is applied from the amplifier 11 the flipflop flips and an output signal appears on the output line 102. This signal is applied to the differentiator, and then the cathode follower. The clock pulse output from the cathode follower, when applied to the counter stage 31 has the same effect as the application of the clock pulse to this stage as described with reference to Figure 3. Therefore from this point on, the operation of the selection circuit is the same as previously described.

Figure 8:
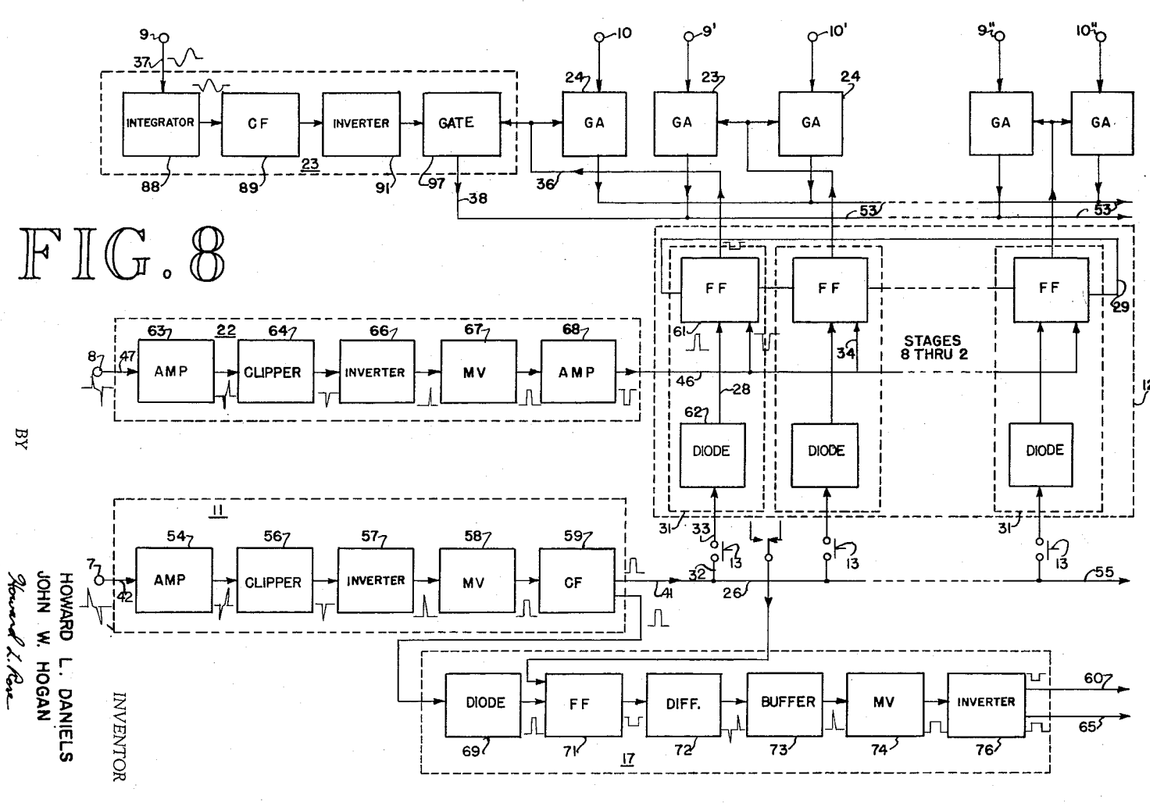
Figures 8 and 9 constitute a detailed block diagram of the entire system using the manual keying input.
Figure 9:
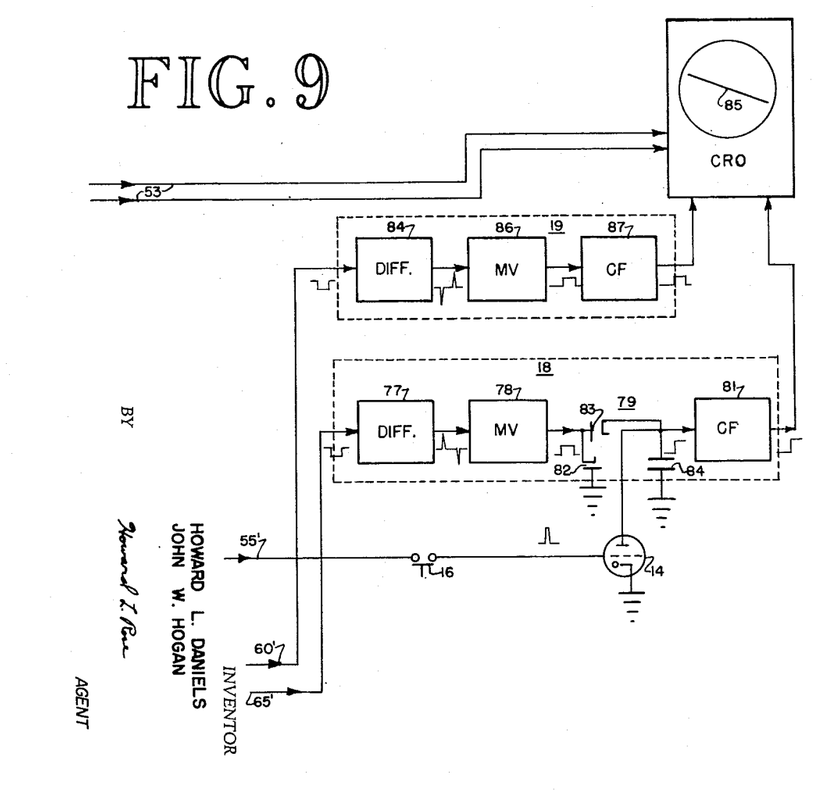

The other output from the cathode follower is applied to the single impulse keyer 17 and takes the place of both the enabling switch 15 and clock pulse input of Figures 2 and 8. Since in this circuit a clock pulse can reach the single impulse keyer only when a character selection is made there is no need for the enabling switch 15 and the flipflop 71. An amplifier and inverter are added to the other components of the keyer as shown in Figure 8. In this circuit, since there is no typewriter-like machine to actuate the carriage return switch 16, the switch is eliminated and a pulse must be supplied from the computer output to the grid of the discharge thyratron 14.

As previously indicated, this system is identical with the prior system except that automatic means are employed for determining which character is to be displayed on the face of the tube.

Figure 11:
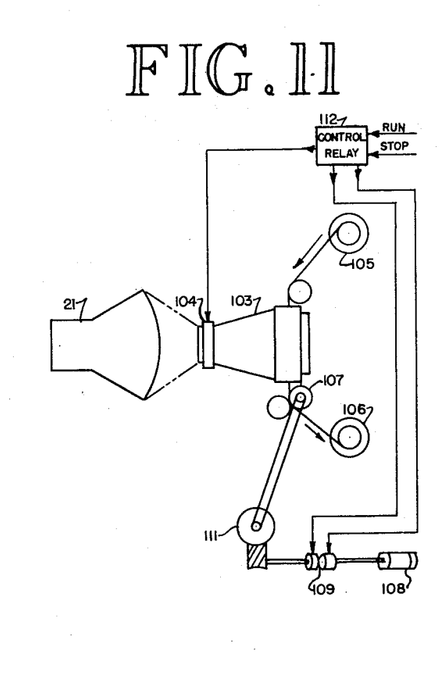
Figure 11 is a schematic diagram of the film feed mechanism and photographing means.

In Figure 11 there is shown the film-travel mechanism and camera for recording the information on the face of the tube. A camera 103 with a solenoid shutter 104 is positioned in front of the cathode-ray oscilloscope 21. The film is supplied from the reel 105 and taken up on the reel 106. The film is driven by the pressure rollers 107, one of which is driven by the motor 108 through the clutch assembly 109 and the gear box 111. The motor 108 is an adjustable speed motor which runs continuously, the film being started or stopped by the clutch assembly 109. The clutch assembly and solenoid shutter are controlled by signals put out from the control relay circuit 112. In turn this circuit is controlled by "run" and "stop" inputs, which may be supplied from a manual switch or from the computer when the automatic system is employed. When the run signal is applied, the output of the control relays opens the solenoid shutter of the camera and energizes the run clutch of the system, thereby starting the movement of the film. Similarly when the recording is to be stopped, the stop signal is fed to the control relays, the stop clutch is energized, and the solenoid shutter is closed.

The invention as described is capable of printing 2000 characters per second when the drum is rotated at 2000 R. P. M. and the drum carries forty separate information areas about its circumference. By increasing the speed of rotation of the drum and the number of information areas on the drum, printing rates of 10,000 characters or more per second may be attained.

It will be apparent that the embodiments shown are only exemplary and that various modifications can be made in construction and arrangement within the scope of our invention as defined in the appended claims.

We claim:

1. A cathode-ray-tube character display system, comprising a magnetic medium having recorded thereon a number of areas of information, each area representing a distinct character which is to be selectively reproduced on the face of a cathode-ray tube, a number of transducer heads arranged at spaced intervals along said magnetic medium, means for producing relative motion between said magnetic medium and said transducer heads, whereby said transducer heads will successively intercept said areas, the output of one of said heads being a series of equally spaced clock pulses, a gating amplifier associated with each of the transducer heads, a cathode-ray tube having its grid normally biased to cutoff, the output of each gating amplifier being connected to a different set of deflection plates of said cathode-ray tube, said gating amplifiers being normally blocked, thereby preventing the gating amplifiers from producing an output signal, means for selecting the character to be displayed on said cathode-ray tube, and means for opening the gating amplifier which is associated with the transducer head that will next intercept the area of information corresponding to the selected character, means responsive to said last-mentioned means and to said clock pulses for producing two output pulses, means responsive to one of said output pulses for producing an unblanking pulse, means for applying said unblanking pulse to the grid of said cathode-ray tube, means responsive to the second of said output pulses for producing a stairstep output voltage and means for applying said stairstep output voltage to one set of deflection plates of said cathode ray tube so as to move the mean position of the beam of the cathode ray tube across the face of the tube in predetermined steps.

2. The invention according to claim 1 in which a photosensitive medium passes continuously in front of said cathode-ray tube, said tube being turned so that the cathode-ray beam sweeps the horizontal axis of said tube along a slope which is in the same direction as the travel of said photosensitive medium.

3. The invention according to claim 1 in which the information signals are arranged in two tracks on the magnetic medium, one track having signals proportional to the horizontal deflection voltages of the character to be displayed, the other track having signals proportional to the vertical deflection voltages of the character to be displayed, there being one character transducer head for each character in each track.

4. The invention according to claim 3 in which there is a gating amplifier for each of said transducer heads in each of said tracks, the gating amplifiers associated with the transducing heads in the horizontal and vertical track which will next intercept the desired signals being opened simultaneously.

5. The invention according to claim 4 in which the means for producing a stairstep voltage comprises a single-shot multivibrator which is triggered by the second output from said means for producing two output signals, and a condenser, said condenser connected to receive and store the output pulses from said single-shot multivibrator.

6. The invention according to claim 5 in which said capacitor is discharged to ground through a tube, said tube being fired by a pulse which is produced when the voltage on said condenser has caused the said beam to move across the face of the tube a predetermined distance.

7. The invention according to claim 6 in which the said means for selecting the gating amplifiers to be opened comprises a ring counter with a stage associated with each group of two gating amplifiers, each stage of said ring counter comprising a bi-stable flipflop, one of said inputs being the clock pulse signal, said clock pulse signal being applied to the flipflop through the character selection means, the second input of each flipflop being connected to receive the position pulse signals, said position pulse signals stepping the ring counter to the proper stage, thereby choosing the correct gating amplifiers.

8. The invention according to claim 7 in which means are provided for photographing the information displayed on the face of said cathode-ray tube.

9. The invention according to claim 8 in which the magnetic medium consists of a rotating drum.

10. The invention according to claim 8 in which the magnetic medium consists of a rotating disk.

11. The invention according to claim 8 in which the selection means comprises a set of manual pushbuttons, one pushbutton located in the clock pulse input circuit to each of said flipflops, said pushbutton passing the clock pulse directly to the flipflop input.

12. The invention according to claim 8 in which the selection means is an electronic keying unit comprising a bi-stable flipflop in each stage of said keying unit, there being one flipflop for each of said characters, one input of said flipflop being connected to be energized by a character pulse in accordance with the character to be displayed, a second input of the flipflop being connected to be energized by said clock pulses, said flipflop passing said clock pulse only when a character pulse has previously been applied, the clock pulse output of said stage being connected to the means for producing two output pulses and to the stage of said ring counter corresponding to the selected character.

References Cited in the file of this patent

UNITED STATES PATENTS

| Number | Name | Date |
|---|---|---|
| 2,458,030 | Rea | Jan. 4, 1949 |
| 2,594,731 | Connolly | Apr. 29, 1952 |
| 2,620,394 | Valensi | Dec. 2, 1952 |